(12) United States Patent
Mitchell et al.

(10) Patent No.: US 7,016,554 B2
(45) Date of Patent: Mar. 21, 2006

(54) OPTICAL MODULATOR

(75) Inventors: Arnan Mitchell, Northcote (AU);
Rodney B. Waterhouse, North Fitzroy (AU); Apalavanapillai Nirmalathas, Lalor (AU); Dalma Novak, North Fitzroy (AU)

(73) Assignees: RMIT University, Melbourne (AU); The University of Melbourne, Parkville (AU)

(*) Notice: Subject to any disclaimer, the term of this patent is extended or adjusted under 35 U.S.C. 154(b) by 27 days.

(21) Appl. No.: 10/486,598

(22) PCT Filed: Sep. 11, 2002

(86) PCT No.: PCT/AU02/01251

§ 371 (c)(1),
(2), (4) Date: Jun. 3, 2004

(87) PCT Pub. No.: WO03/023502

PCT Pub. Date: Mar. 20, 2003

(65) Prior Publication Data

US 2005/0063035 A1  Mar. 24, 2005

(30) Foreign Application Priority Data

Sep. 11, 2001  (AU)  .................... PR7612

(51) Int. Cl.
  *G02F 1/01* (2006.01)
  *G02F 1/035* (2006.01)
  *G02F 1/295* (2006.01)
(52) U.S. Cl. .................. 385/1; 385/2; 385/8
(58) Field of Classification Search ............ 385/1, 385/2, 8
See application file for complete search history.

(56) References Cited

U.S. PATENT DOCUMENTS

| 4,372,643 | A | 2/1983 | Liu et al. |
| 5,615,037 | A | 3/1997 | Betts et al. |
| 5,781,327 | A | 7/1998 | Brock et al. |
| 5,787,211 | A * | 7/1998 | Gopalakrishnan ............... 385/2 |
| 6,504,640 | B1 * | 1/2003 | Gopalakrishnan ........... 359/245 |
| 6,744,548 | B1 * | 6/2004 | Abeles ....................... 359/254 |
| 2004/0062466 | A1 * | 4/2004 | Porte et al. .................... 385/3 |
| 2004/0170351 | A1 * | 9/2004 | Fishman et al. ............... 385/3 |

FOREIGN PATENT DOCUMENTS

| EP | 0287537 | 3/1992 |
| GB | 2266384 | 10/1993 |

* cited by examiner

Primary Examiner—Kaveh Kianni
Assistant Examiner—Charlie Peng
(74) Attorney, Agent, or Firm—Ladas & Parry LLP (57) ABSTRACT

The present invention provides an optical modulator for modulating an optical carrier by an electrical signal. The modulator comprises a first and a second waveguide for guiding the optical carrier, each waveguide is formed from, or being juxtaposed with respect to, an electro-optic material. The modulator also comprises a series of cavities associated with the first waveguide and the second waveguide and means for applying the electrical signal having a predetermined bandwidth to the cavities. The cavities have a resonant frequency within the predetermined bandwidth.

The present invention also provides a device for optical single sideband with carrier (OSSB+C) transmission. The device has parallel-coupled cavities.

27 Claims, 11 Drawing Sheets

FIG. 11

OPTICAL MODULATOR

FIELD OF THE INVENTION

The present invention relates generally to an optical modulator and, in particular, to an optical modulator for the modulation of an optical carrier by an electrical signal that is applied to cavities of the optical modulator.

BACKGROUND OF THE INVENTION

Optical fibre communication provides a range of advantages compared with conventional "copper-wire" communication, including higher transmission speed and wider bandwidth. The transfer of information is often achieved by superimposing (modulating) the information onto an optical carrier using an electro-optic modulator. Mach-Zehnder type interferometric intensity modulators (MZM) are used for broadband communication links and MZM devices with very large bandwidths in excess of 40 GHz have been demonstrated.

A standard broadband electro-optic modulator comprises a travelling wave electrode which is located adjacent to an electro-optic waveguide. The electric field carried by the travelling wave electrode alters locally the optical properties of the electro-optic waveguide which in turn influences the propagation of the optical carrier and thus transfers the electrical signal information onto the optical carrier. Such broadband modulators tend to be fairly inefficient, with only modest electrical-to-optical conversion efficiency, which limits their application.

Wireless communications typically do not require the extended bandwidth of which MZM devices are capable. For example, the Personal Communication Systems (PCS) standards requires only 60 MHz bandwidth around a centre frequency of 1.9 GHz, allowing great potential for the optimisation of modulation efficiency through resonant enhancement. Future broadband wireless systems designed to operate at millimeter-wave frequencies may require only 1–2 GHz bandwidth centred around operating frequencies in the range of 5–66 GHz.

The electro-optic modulation of an optical carrier by an electrical signal does not involve a transfer of power; instead the optical modulation achieved is proportional to the field strength across the active region of the device, whether this field is a power carrying propagating wave, or a standing wave. It is thus possible to utilise electrodes to generate resonant standing wave structures to greatly increase the field strength at the cavity and hence enhance the modulation efficiency at that resonance. Several demonstrations of resonantly enhanced MZM devices have been reported with significant improvements in efficiency being achieved. For example, a resonantly enhanced modulator which incorporated two electrical terminals that form single a Fabry-Perot type cavity over the active region, had a reported enhancement in link performance of 10 dB at resonance frequency.

Although the development of a single cavity electrode structure at higher radio frequencies should offer many benefits, several shortcomings have also been identified. Across the resonance, the phase response will vary rapidly with frequency. For electrical signals close to the resonant frequency, this variation should be fairly linear, however, it is expected that electrical signals on the edges of the bandwidth may be significantly distorted. In addition, the effectiveness of a single cavity is limited. The length of a standing wave cavity usually corresponds to a half wavelength of the applied electrical signal which is short compared with the typical length of an arm of a MZM device. Longer cavities, with a length corresponding to an integer multiple of the radio frequency wavelength, are not necessarily associated with a higher effectiveness as the strength of the electric field, which results in the modulation of the optical carrier decaying exponentially along the electrode length.

Frequently it is also required to modulate two or more optical carriers, which are guided in separate waveguides, by the same electrical signal. For particular applications, it may be required to achieve a particular phase offset between the modulated signals. One of such examples includes a device which will eliminate one side band and therefore allow for optical single sideband with carrier (OSSB+C) transmission. OSSB+C transmission has the capacity to mitigate the transmission impairment induced by the chromatic dispersion of the transmission optical fibre. Generation of OSSB+C formatted signals can be made possible by applying two identical modulating electrical signals which have a relative phase offset of 90° onto a modulator with two different electrodes corresponding to two different arms of the MZM interferometer. Inside the optical modulator, an optical signal is split into two optical carriers which are then modulated by those applied electrical signals with a 90° phase shift. If, also, the optical carriers travelling in both arms of the modulator have a relative phase offset of 90° between them, the subsequent optical addition of both modulated carriers results in the cancellation of one sideband. A device for this purpose may typically comprises a Mach-Zehnder type modulator with two optical arms, two electrical inputs and a separate 90° radio frequency hybrid coupler. Previous publications have shown that it is critical to maintain a phase difference of the electrical signals applied through the hybrid coupler to the arms of the modulator to within a maximum error of ±5· in order to maximise the suppression of one sideband. In this configuration, however, achieving 90°±5· phase shift over a very wide frequency band of the electrical signals, which are typically in the GHz range, can be very difficult. A typical electrical signal may be a radio frequency signal having a wavelength of the order of 4 mm and the required mechanical accuracy would correspond to approximately 50 $\mu$m, which is difficult to achieve with external connectors.

It is therefore desirable to provide a device which has increased effectiveness (i.e. modulation depth) and/or which allows for the synchronised modulation of the optical carrier in branched waveguides.

SUMMARY OF THE INVENTION

The present invention provides in a first aspect an optical modulator for modulating an optical carrier by an electrical signal, the modulator comprising:

a first and a second waveguide for guiding the optical carrier, each waveguide being formed from, or being juxtaposed with respect to, an electro-optic material, at least one series of cavities associated with the waveguides, means for applying the electrical signal having a predetermined bandwidth to the cavities; the cavities having a resonant frequency within the predetermined bandwidth.

The electric field component of the applied electrical signal penetrates the electro-optic material and the electro-optic effect results in a phase modulation of the carrier guided in the waveguides. As a plurality of cavities is involved, a relatively large depth of modulation is achieved.

The cavities typically are series-coupled. The optical modulator typically comprises a first series of cavities associated with the first waveguide and a second series of cavities associated with the second waveguide. The cavities of the first series may be series-coupled and also the cavities of the second series may be series-coupled.

The first and the second waveguides typically are arms of a Mach-Zehner-type interferometer device. Each of the cavities may comprise an elongated live electrode and an elongate ground electrode. The live and ground electrodes may be electrically connected by inductors and/or capacitors or transmission line equivalents. The inductances and/or capacitances of the or each series of cavities typically have values which result in an overall modulation response of the one or each series of cavities that approaches linearity within the predetermined bandwidth.

In a specific embodiment of the invention each cavity of the first series is parallel-coupled with a respective cavity of the second series. The parallel-coupling typically is affected in a manner so to induce standing waves in the cavities, the cavities being disposed in a relationship to each other such that a predetermined phase difference is established for the modulation of the branched optical carrier guided in the respective waveguides. Electrical connections of live electrodes of the cavities typically are positioned intermediate the ends of the respective cavities. The electrical connections between the cavities associated with the first waveguide and the second waveguide equalise locally their electric fields. By choosing i) dedicated positions for the connections along the live electrodes of respective cavities and ii) dedicated positions for cavities along the optical pathways of the associated waveguide portions, the relative phase difference between the modulated branched carrier can be controlled. The live electrodes of the cavities of the first series and the live electrodes of the cavities of the second series may be parallel-connected at positions along the live electrodes which approximately correspond to maximum electric fields of the standing waves.

The cavities of the first and the second series of cavities may be disposed in a relationship to each other in a manner such that a phase difference of 90° for the modulation of the optical carriers guided in the first waveguide and in the second waveguide is established. The optical modulator may form a part of a device for optical single sideband with carrier (OSSB+C) transmission.

The period of the electrical signal P typically is selected to approximate $n/2 \times t_p$ where $t_p$ is the propagation time of the carrier along a length l of the waveguide, where l approximates the length of the cavities and n is an integer. Each of the cavities may have a slightly different resonant frequency within the predetermined bandwidth. The live and the ground electrodes of each cavity typically are spaced apart and are substantially parallel to one another. The first and second waveguides typically are arranged substantially parallel to and intermediate the live and ground electrodes of the associated cavities. Each of the ground electrodes may be one of a pair of spaced-apart ground electrodes. The first and the second waveguides may form a pair of waveguides positioned between a pair of ground electrodes and each of the live electrodes may be positioned between the pair of waveguides.

The present invention provides in a second aspect an optical modulator for modulating an optical carrier by an electrical signal, the modulator comprising:

a first and a second waveguide for guiding the carrier, each waveguide being formed from, or being juxtaposed with respect to, an electro-optic material, a first cavity associated with the first waveguide and a second cavity associated with the second waveguide, means for applying the electrical signal having a predetermined bandwidth to the cavities; the cavities having a resonant frequency within the predetermined bandwidth and being parallel-coupled and arranged such that, in use, a phase difference for the modulation of the carrier guided in the first and the second waveguide is effected.

The phase difference typically is 90°. The waveguides and the cavities may be fabricated on a common substrate such as a wafer.

The present invention provides in a third aspect a device for optical single sideband with carrier (OSSB+C) transmission comprising:

a first and second a waveguide for guiding the carrier, each waveguide being formed from, or being juxtaposed with respect to, an electro-optic material, at least one cavity associated with the first waveguide and at least one cavity associated with the second waveguide, means for applying an electrical signal having a predetermined bandwidth to the cavities; the cavities being parallel-coupled and having a resonant frequency within the predetermined bandwidth.

Specific embodiments of the optical device will now be described, by way of example only, with reference to the accompanying drawings.

DETAILED DESCRIPTION OF SPECIFIC EMBODIMENTS

Figure 1:
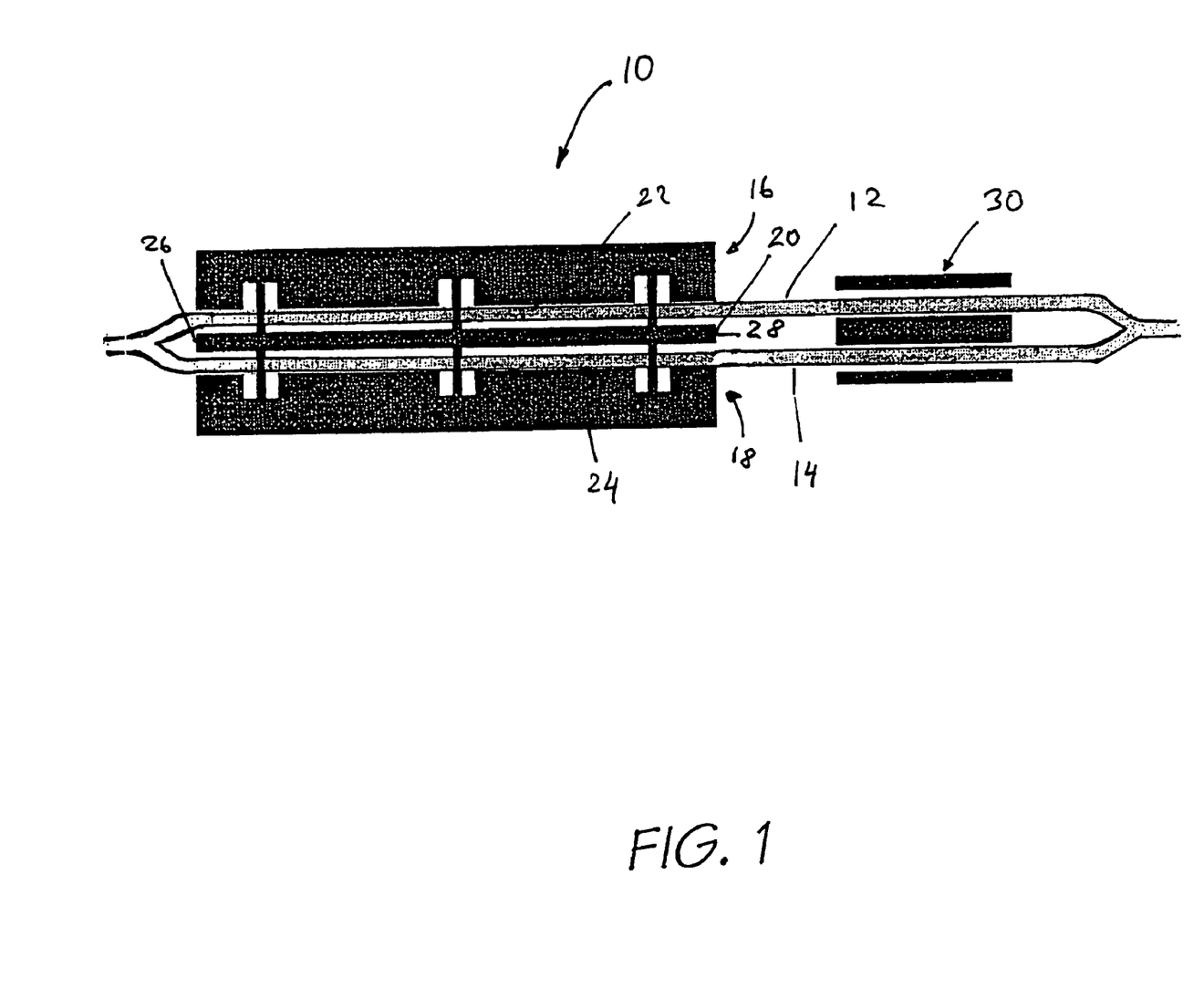
FIG. 1 shows a schematic representation of a Mach-Zehnder optical modulator according to an embodiment.

Referring to FIG. 1, a specific embodiment of the optical modulator is now described. The modulator 10 comprises a first waveguide 12 and a second waveguide 14 which are joined to form a Mach Zehnder type arrangement. In this embodiment the optical waveguides 12 and 14 are composed of an electro-optic material. A series of two series-coupled cavities 16 is associated with the first waveguide 12 and the second waveguide 14. The cavities 16 and have a live electrode 20 and ground electrodes 22 and 24. The waveguides 12 and 14 are positioned intermediate the ground electrodes 22 and 24. In use, a radio frequency signal is travelling through the live electrode from position 26 to position 28. The cavities are portioned such that resonant standing waves are formed in the cavities. The electric field of the standing waves alter locally the refractive index of the waveguides 12 and 14 such that the speed of a guided optical signal is modulated and thus the phase of the optical signal is modulated. A DC bias electrode arrangement 30 is used to shift the phase of the optical carrier guided in waveguides 12 and 14.

It will be appreciated, that, in a variation of this embodiment, instead of one series of cavities being associated with both waveguides, a first series of cavities may be associated with one of the waveguides and a separate second series of cavities may be associated with the other waveguide.

Figure 2:
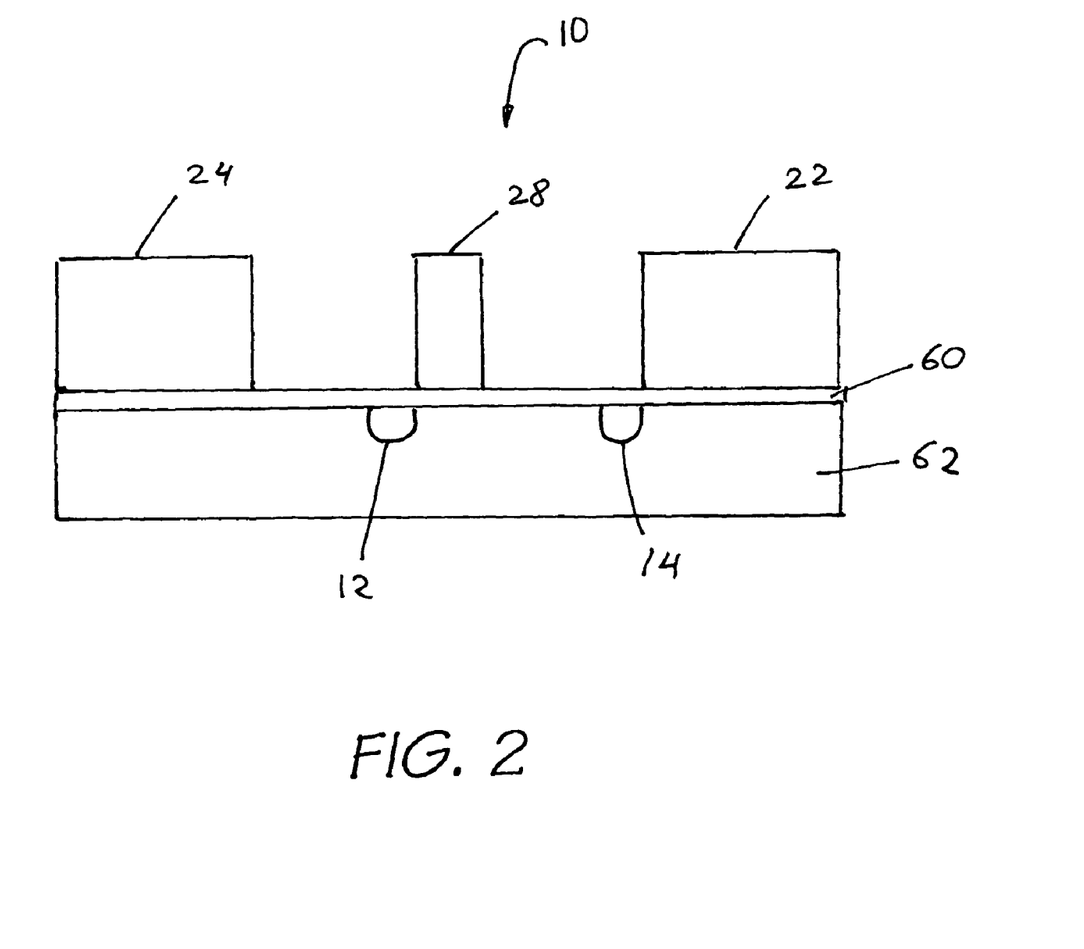
FIG. 2 shows a cross-sectional view of a schematic representation of an optical modulator of the type shown in FIG. 1.

FIG. 2 shows a cross-sectional view of a schematic representation of an optical modulator of the type shown in FIG. 1. Electrodes 22, 24, and 28 are deposited on a buffer layer of $SiO_2$ 60. The buffer layer 60 is deposited on a $LiNbO_3$ substrate 62 and the first and second waveguides are formed by Ti diffusion into the $LiNbO_3$ substrate.

For radio frequency index matching and to minimise radio frequency attenuation it is important to carefully select the values of gap-width-gap (the two distances between ground electrode 22, live electrode 28 and ground electrode 24), the thicknesses of these electrodes and also the thickness of the buffer layer 60. Close proximity of an optical waveguide to be phase modulated to the live electrode (where most of the radio frequency field is concentrated) is preferred.

Optimised modulator electrodes may have a gap-width-gap of 30–5–30 $\mu$m, electrode thickness of 30 $\mu$m and a $SiO_2$ buffer layer thickness of 1 $\mu$m. This provides an optimum combination of low radio frequency attenuation, near 50$\Omega$ impedance and radio frequency propagation rate equal to the optical propagation rate.

Figure 3:
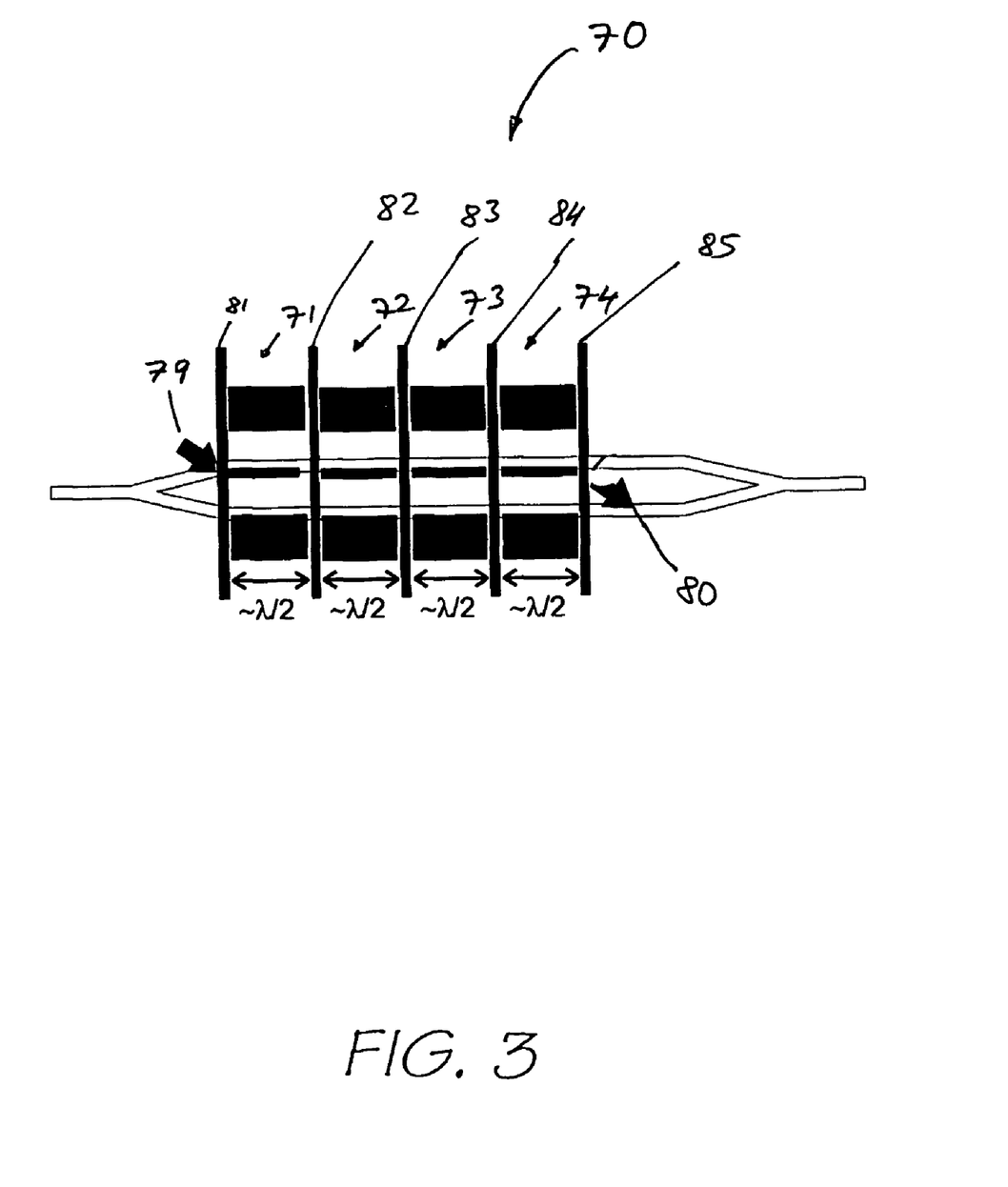
FIG. 3 shows a schematic representation of an optical modulator according to another embodiment.

FIG. 3 shows an optical modulator 70 that is related to that shown in FIG. 1, but comprises a series of four series coupled resonant cavities (71–74) associated with two waveguides. Each cavity has a length that approximates half the wavelength $\lambda$ of a radio frequency signal that, in use, is passing through the modulator from terminal 79 to terminal 80. The cavities are defined by strong rf mirrors 81–85 which effect weak coupling between the cavities. The resultant resonance of the applied rf signal in the cavities resonance causes the field on the electrode to become many times stronger than the original applied field. This weak coupling is in this embodiment provided through shunt inductors. Other configurations are possible including series capacitors between cavities, but it is believed that using inductors as shown will minimize the amount of radio frequency attenuation associated with each termination and will maximize the amount of resonating electric field that interacts with the optical waveguide (the amount of field within the inductor will be nearly zero at the desired resonance, as where the field would be maximum for a capacitive circuit).

It is possible to model the resonating field using a network of transmission matrices. Transmission matrices allow the voltage and current on one side of a two port circuit element to be calculated from the voltage and current on the other. It is possible to calculate the transmission of a network of two port circuit elements by generating a matrix of transmission matrix connections between voltage nodes and then solving for a given set of boundary conditions. The modulator according to this specific embodiment has been modeled using this simple approach.

For the purpose of this specific embodiment the voltage along the length of a transmission network is of interest, since it is this voltage that actually causes optical modulation. The amount of radio frequency signal that is transferred to the output of the electrode is not directly significant. It is thus important to keep track of not only the voltage at each node of the transmission network, but also the voltage occurring at each point along each of the transmission line. For this purpose, it is possible to simply divide the transmission line into a number of segments. Finally to calculate the strength of the optical modulation achieved at a specific frequency, it is necessary to integrate the local phase modulation produced by the voltage present at each point along the segmented electrode with length. The local phase modulation induced by an applied voltage on a modulator electrode can be described by equation (1)

$$\phi(z,t) = V_0(z) e^{-j\omega t} \tag{1}$$

where $V_0(z)$ is the complex amplitude of voltage along the length of the transmission line segments. Since the optical carrier is moving with respect to the electrode at a rate of $z/t = n_o/c$, where $n_o$ is the optical effective index, this integral must be carried out in the moving frame of reference of the optical carrier. Thus the integral required to calculate the accumulated phase modulation is actually:

$$\phi_{ac} = \int_0^d V_0(z) e^{-jk0n_oz} dz \tag{2}$$

It is worth noting in a Mach-Zehnder modulator, amplitude modulation is achieved by summing and interfering two such phase modulated optical paths.

A simple software model implementing the network transfer matrix model and above voltage integral has been implemented. The design and analysis to be presented in the following section has been performed using this software.

As an example of the resonant enhancement, it has been chosen to design a four element resonant modulator operating at 10 GHz (see FIG. 3). It will be appreciated, however, that the invention is not limited to a fourth order resonant modulator but also applicable to higher or lower order modulators. In particular, the invention is applicable for the realisation of higher (10–20 order) order modulators operating at higher frequencies (eg 40 GHz). At these higher frequencies, the cavity lengths will be shorter and thus more cavities will be required in order to make full use of the available electro-optic interaction length. Higher order devices should also offer more scope for tailoring of the frequency response but will require precise control of the cavity termination characteristics. For this model calculation the length of each cavity 71 to 74 was assumed to be 6.75 mm and the inductances of the couplings 81 to 84 were 1.1 nH. The output of the cascaded cavities is short circuited at 85(0 nH).

Figure 4:
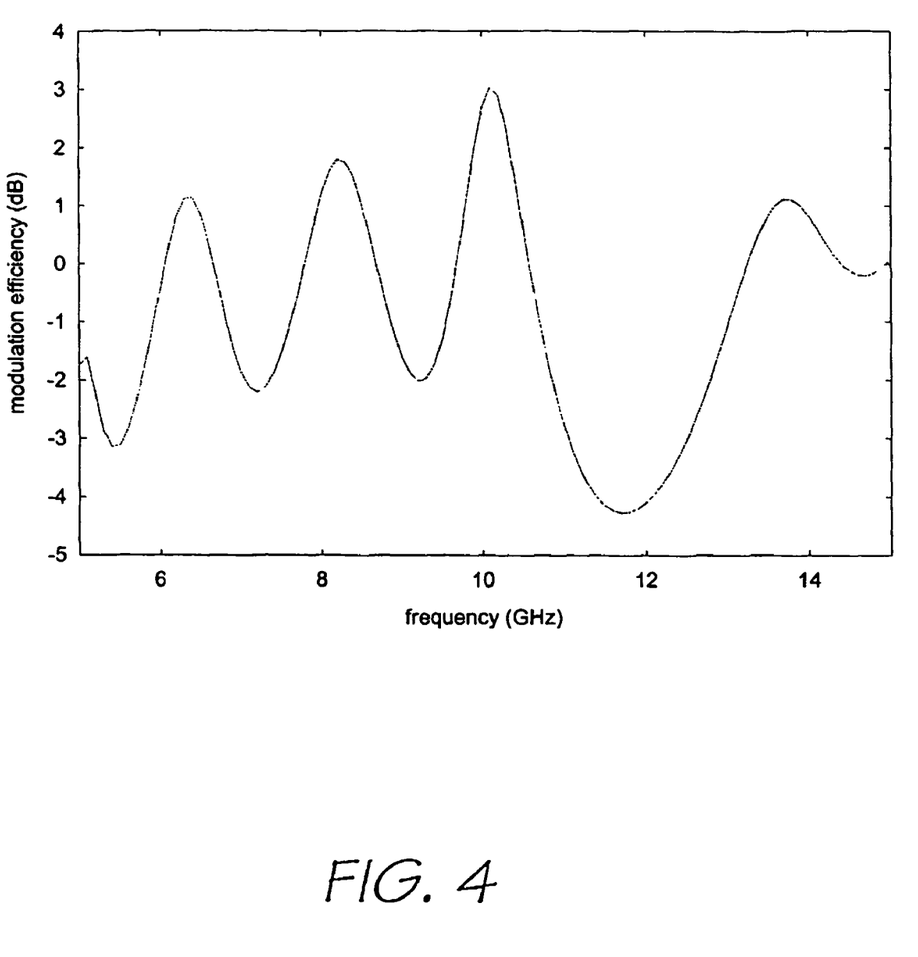
FIG. 4 shows a plot of a calculated modulation efficiency as a function of frequency.

A transmission line effective index ($N_m$) of 2.15 was assumed and a conductor attenuation ($\alpha$) of 0.25 dB/(cmGHz$^{1/2}$). The lengths were chosen to be simply a half wavelength at 10 GHz considering an $N_m$ of 2.15 and the inductance values were chosen to to optimize the optical modulation predicted using Equation (2). The photonic link gain enhancement was predicted by Equation (2). This response has been normalized with respect to the modulation predicted for an electrode consisting of the same transmission line segments but with the inductive terminations omitted. An enhancement factor of 3 dB is evident at 10 GHz with a 3 dB bandwidth of 9%. Significant improvements are predicted using electro-magnetically optimized cavities such that enhancements of the order of 10 dB or so should be realized. FIG. 4 shows the the modulation efficiency as a function of the frequency for this model.

Figure 5:
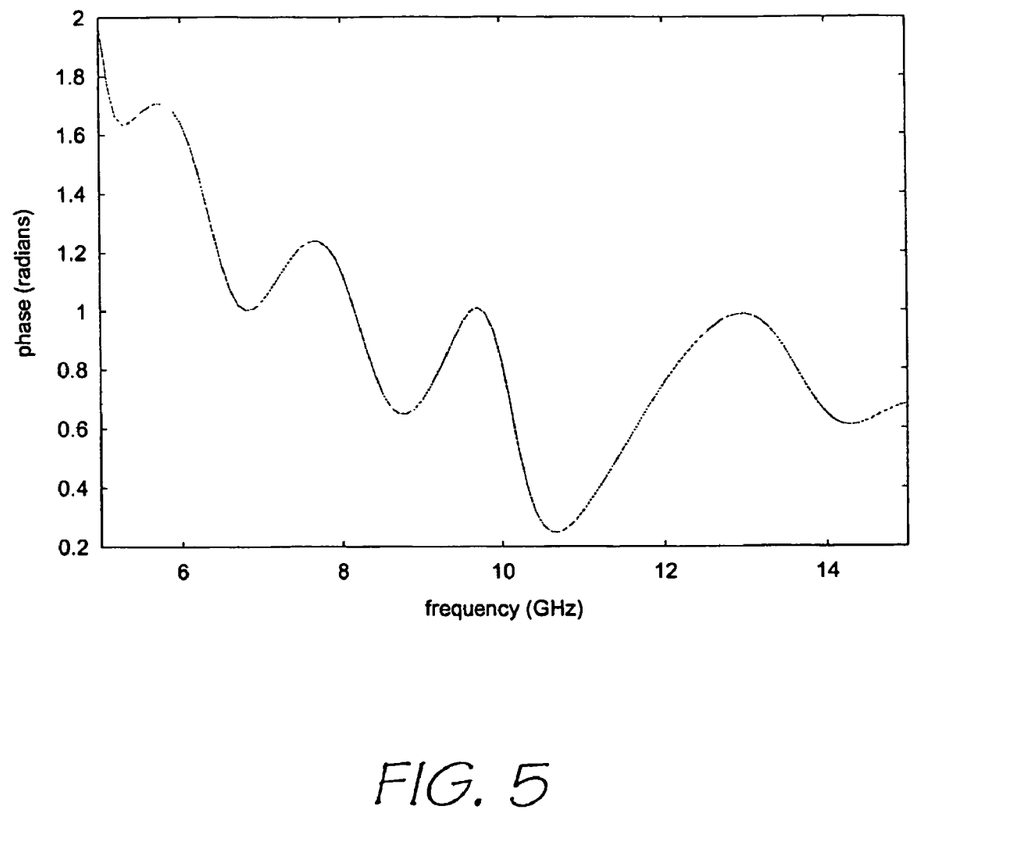
FIG. 5 shows a plot of a calculated phase as a function of frequency.

Although the phase response shown in FIG. 5 is not ideal, this can easily be improved upon. The parameters for this model calculation were chosen using very basic criteria, with each cavity identical. It is known that filters and hence these parameters based upon Bessel Thompson functions give excellent pass-band responses with steep skirts and linear phase responses. Utilizing this approach to design for the electro-optic modulation response, rather than the electrical transmission response, will improve the performance of the device.

Figure 6:
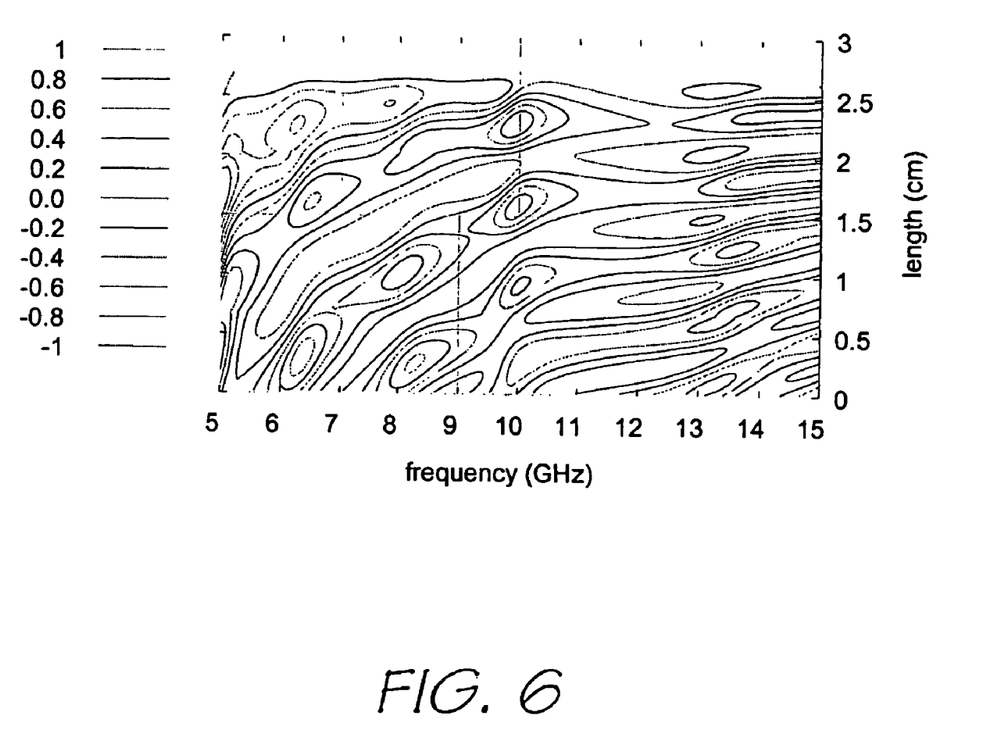
FIG. 6 shows a plot of the magnitude of the voltage as experienced by propagating optical carrier as a function of both frequency and distance along the optical modulator.

FIG. 6 shows the magnitude of the voltage as experienced by the optical carrier along the length of the coupled electrodes and as a function of frequency. It is clear that at the 10 GHz resonance, the standing waves of each subsequent cavity provide positive contributions to the modulation.

To realize the inductors required for this implementation, it is proposed that an external microwave substrate be used with inductors realized as microstrip or coplanar waveguide shorted stubs. This substrate may then be flip-chip bonded to the modulator electrode.

Figure 7:
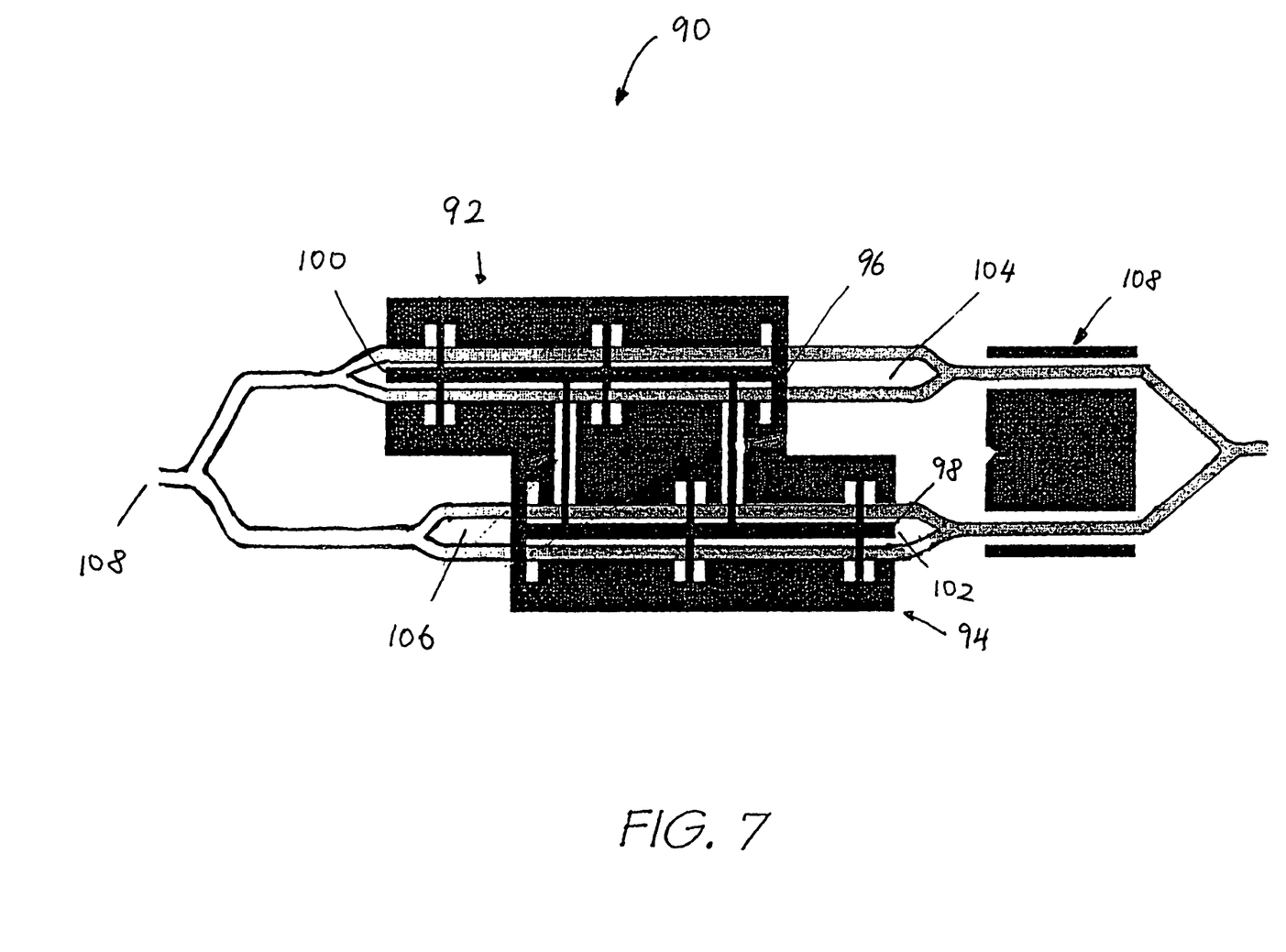
FIG. 7 shows a schematic representation of a device for optical signal side and with carrier (OSSB+C) according to a further embodiment.

Referring to FIG. 7, a device for optical signal side band suppression and with carrier (OSSB+C) according to another specific embodiment of the present invention is now described. The device 90 comprises two optical modulators 92 and 94, each being closely related to the optical modulator 10 shown in FIG. 1. The optical modulators 92 and 94 each have a series of two cavities and their live 96 and 98 are parallel-coupled. An rf signal is travelling through the live electrodes from position 50 to position 52. The modulators 92 and 98 and the connections of the live electrodes 96 and 98 are positioned such that an optical carrier guides through the waveguide pairs 104 and 106 will have a relative phase difference of 90°. A DC bias electrode arrangement 108 is used to shift the phase of the optical carrier by 90°. The combined phase shifts result in the elimination of one of the two sidebands that is generated when the optical carrier is modulated with the radio frequency signal.

Figure 8:
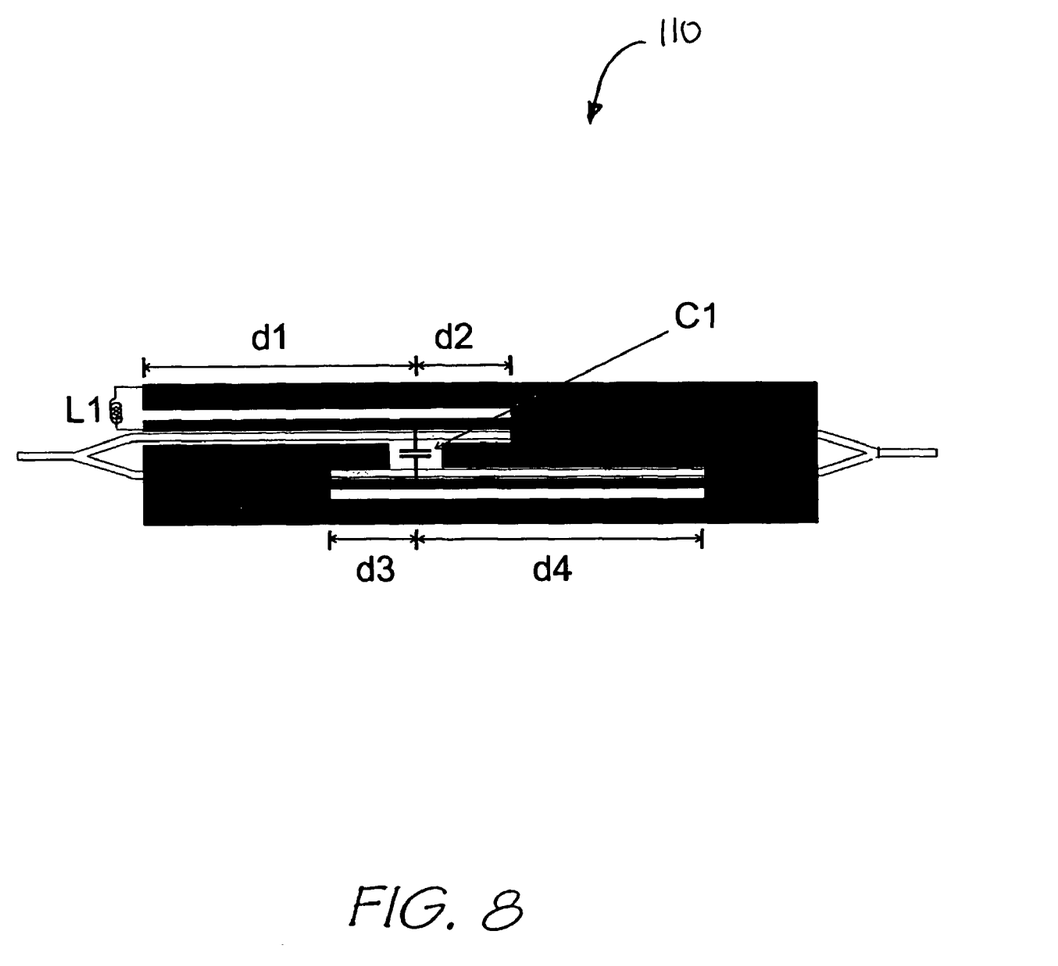
FIG. 8 shows a schematic representation of a device for optical signal side and with carrier (OSSB+C) according to yet another embodiment.

FIG. 8 shows a variation of this embodiment. In this case the device 110 comprises two cavities linked by a synchronising capacitor. The two resonant electrodes are physically offset by approximately half a resonant wavelength in order to ensure that the optical carriers are modulated with a 90° phase shift at resonance. The parameters for the device 110 shown in FIG. 8 are as follows: Length d1: 23 mm; length d2: 8.33 mm; length d3: 29.5 mm; length d4: 8.33 mm; indictor L1: 2.4 nH, capacitor C1: 2.5 pF.

Figure 9:
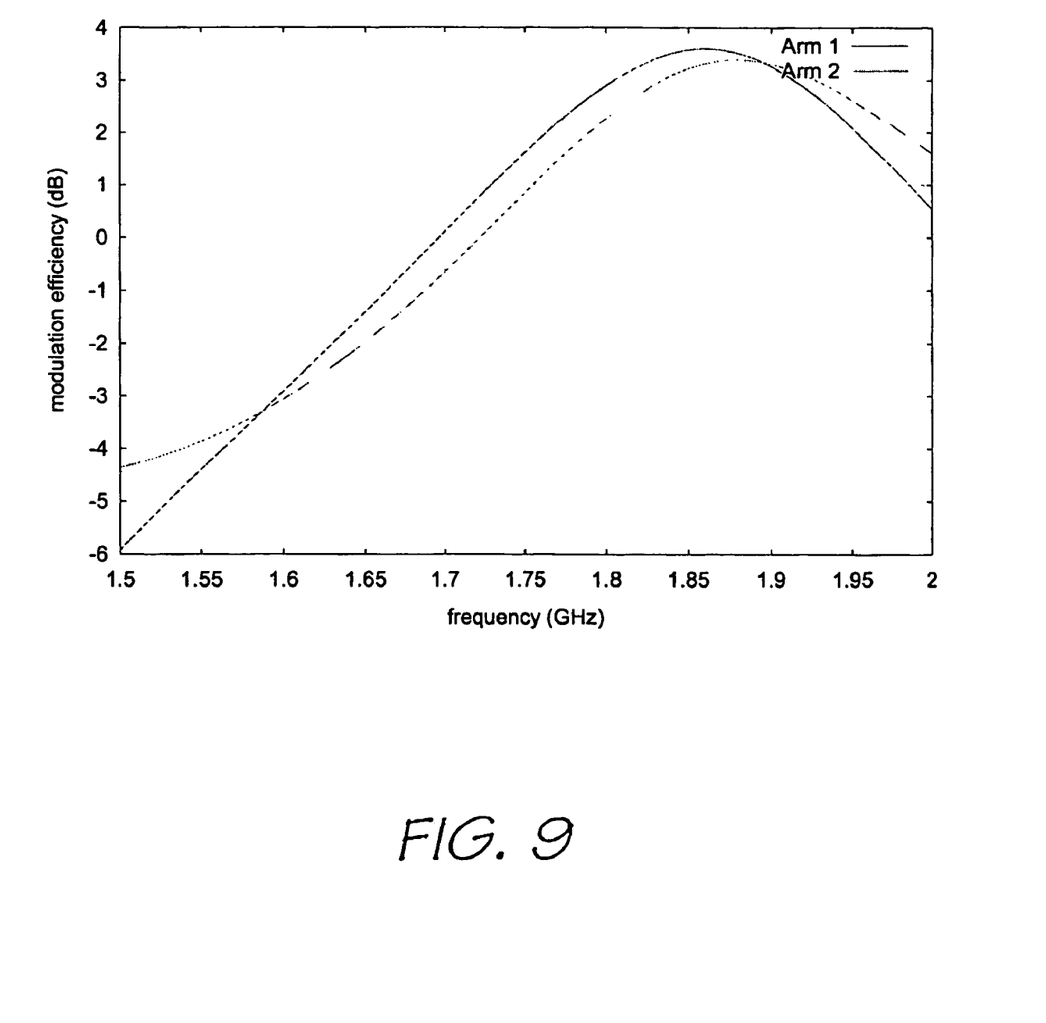
FIG. 9 shows a plot of modulation efficiency as a function of frequency for the device shown in FIG. 8.

This device was again modeled using the purpose built transmission matrix network model to evaluate equation (2). In this case this was done independently for both of the optical arms. The modulation efficiency of each of the optical arms is presented in FIG. 9. The modulation efficiency of each arm has been normalized to a modulator of the same cavity length without resonant enhancement and driven with only half power to simulate the splitting that would occur in a hybrid in order to modulate both electrodes.

Figure 10:
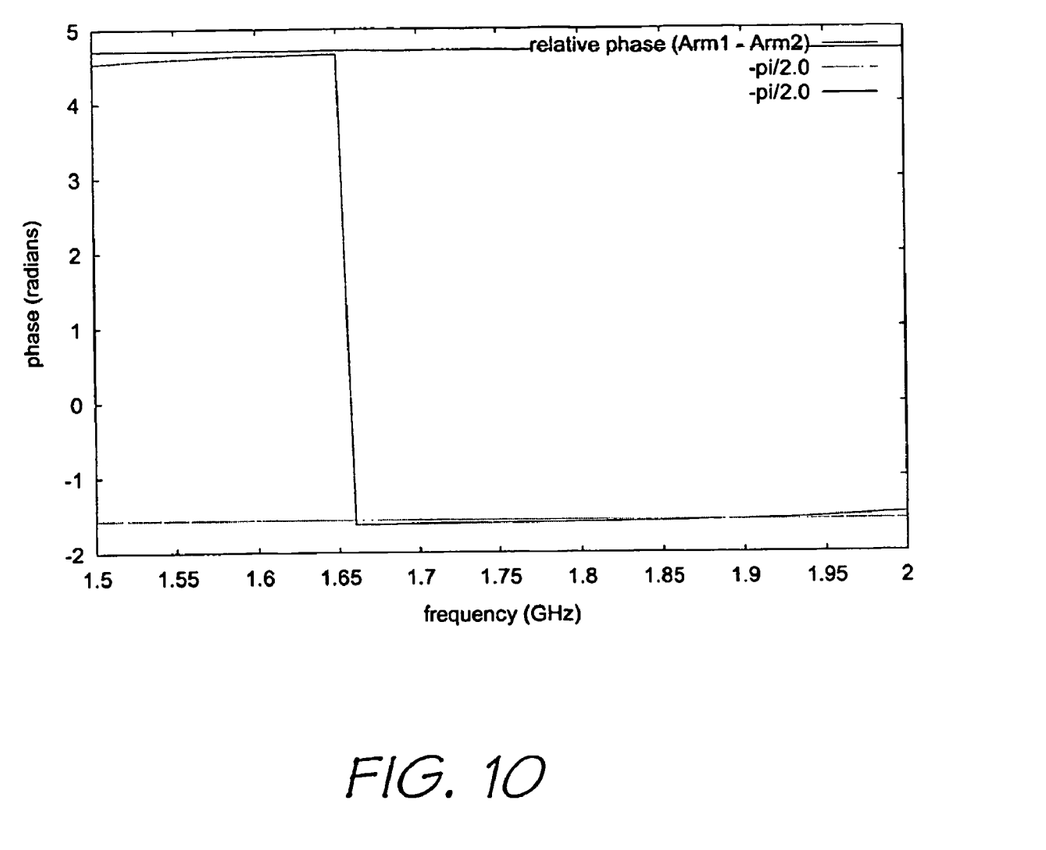
FIG. 10 shows a plot of relative phase as a function of frequency for the two arms of the device shown in FIG. 8

The relative phase of the optical modulation on each of the two arms is presented in FIG. 10. It is evident that a 90° phase shift is maintained between the two arms in the region of the resonance.

Figure 11:
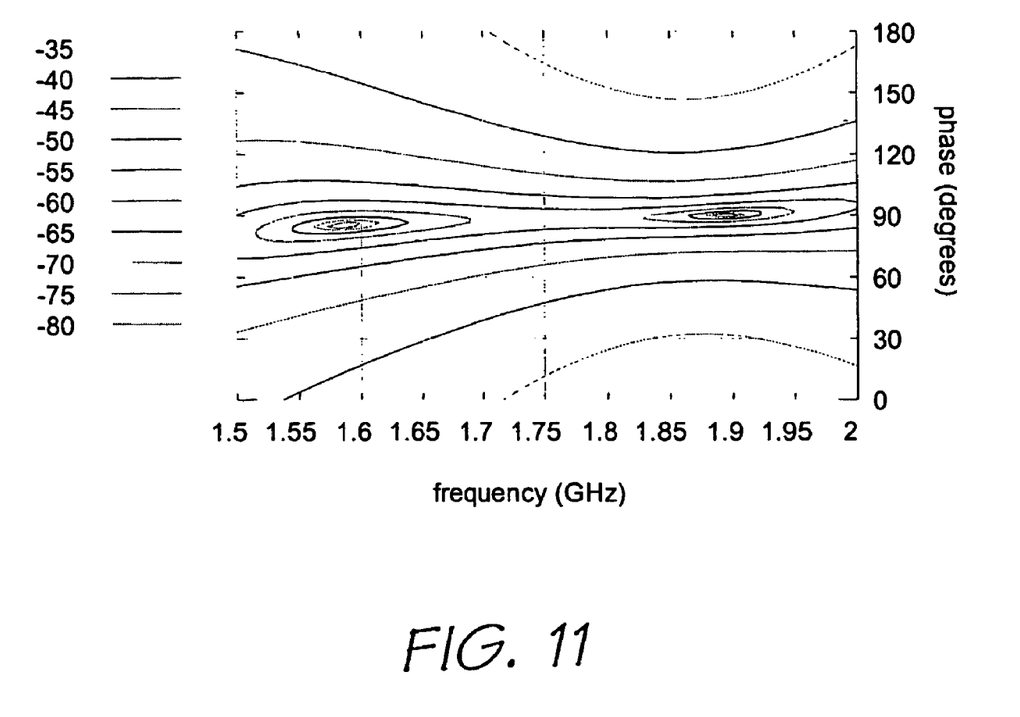
FIG. 11 shows a plot of the ratio of power in the upper and lower modulation sidebands as a function of frequency and applied DC bias phase for the device shown in FIG. 8.

To assess the SSB performance of the device, the power in the upper and lower sidebands resulting from the addition of the two optical carries in the Mach-Zehnder configuration must be calculated. This can be achieved using the following equations:

$$P_u = |\phi_1 + e^{j\theta}\phi_2|^2 \qquad (3)$$

$$P_l = |\phi_1^* + e^{j\theta}\phi_2^*|^2 \qquad (4)$$

Where $\phi_1$ and $\phi_2$ are the complex accumulated optical phase shift along optical waveguides 1 and 2 respectively, $\phi^*$ indicates conjugation and $\theta$ is the DC bias optical phase shift introduced between the two optical carriers. The ratio of $P_u/P_l$ is presented as a function of frequency and optical phase shift $\theta$ in FIG. 11. It is evident that a sideband extinction of better than 25 dB may be achieved with an optical phase shift of approximately $\theta=90°$ over the range of resonant frequencies. Thus, not only is a 3 dB resonant enhancement achieved, but also OSSB+C operation is achieved without the need for external components.

It will be appreciated that the invention is not limited to these specific embodiments. Other embodiments include:
An optical modulator device with two resonant electrodes each phase modulating one arm of a Mach-Zehnder interferometer where the signal applied to the two resonant electrodes are similar but 90 degrees out of phase and where this phase shift is supplied by some means other than a geometric offset, for example an external or integrated quadrature hybrid coupler;
An optical modulator device where the coupling structures between the electrode cavities amplify the reflected and transmitted signal. This does not only enhance modulation through the electrical gain, but also significantly enhances the sharpness of resonances allowing a much higher enhancement factor to be achieved but over a narrower bandwidth. Such an amplifying termination could be achieved through the use of transistors in combination with the equivalent inductor and/or capacitor coupling structures.

The method of fabrication the optical modulator may comprise the steps of:
Fabricate single mode optical waveguides using standard Ti diffusion techniques
Sputter deposit $SiO_2$ buffer layer
Electroform thick gold electrodes
Fabricate external printed circuit board inductive and capacitive microstrip equivalents
Flip-chip bond external components to electrodes Although the invention has been described with reference to particular examples, it will be understood that variations and modifications may be made that fall within the scope of the appended claims.

The invention claimed is:

1. An optical modulator for modulating an optical carrier by an electrical signal, the modulator comprising:
   a first and a second Waveguide for guiding the optical carrier, each Waveguide being formed from, or being juxtaposed with respect to, an electro-optic, material;
   at least one series of cavities associated with the waveguides, each cavity comprising a live electrode and a ground electrode, respective live and ground electrodes being electrically connected by at least one of: inductors, capacitors, transmission line equivalents of inductors or transmission line equivalents of capacitors;

means for applying the electrical signal having a predetermined bandwidth to the cavities; the cavities having a resonant frequency within the predetermined bandwidth.

2. The optical modulator as claimed in claim 1 wherein the cavities are series-coupled.

3. The optical modulator as claimed in claim 1 wherein a first series of cavities is associated with the first waveguide and a second waveguide of cavities is associated with the second waveguide.

4. The optical modulator as claimed in claim 3 wherein the cavities of the first series are series-coupled and the cavities of the second series are series-coupled.

5. The optical modulator as claimed in claim 3 wherein each cavity of the first series of cavities is parallel-coupled with a respective cavity of the second series of cavities.

6. The optical modulator as claimed in claim 5 wherein parallel-coupling of the cavities is affected in a manner so to induce standing waves in the cavities.

7. The optical modulator as claimed in claim 6 wherein the cavities are disposed in a relationship to each other such that a predetermined phase difference is established for the modulation of a branched optical carrier guided in the first and the second waveguide.

8. The optical modulator as claimed in claim 5 wherein the cavities of the first series are disposed in a relationship to the cavities of the second series in a manner such that a phase difference of substantially 90° for the modulation of the optical carriers guided in the first and the second waveguides is established.

9. The optical modulator as claimed in claim 1 wherein the live and ground electrode of each cavity are elongate.

10. The optical modulator as claimed in claim 1 wherein the respective live and ground electrodes are electrically connected by transmission line equivalents having values which result in an overall modulation response of each series of cavities that approaches linearity within the predetermined bandwidth.

11. The optical modulator as claimed in claim 5 wherein parallel-coupling is effected by electrically connecting the live electrodes of the cavities of the first series with the live electrodes of respective cavies of the second series at positions between the ends of each cavity.

12. The optical modulator as claimed in claim 11 wherein electrical connections between cavities are positioned at positions along the live electrodes which approximately correspond to maximum electric fields of the standing waves.

13. The optical modulator as claimed in claim 12 wherein the electrical connections between the cavities are positioned at positions along the live electrodes which approximately correspond to maximum electric fields of the standing waves.

14. The optical modulator as claimed in claim 1 wherein the period of the electrical signal P is selected to approximate $t_p/2$ or $n \times t_p$ where $t_p$ is the propagation time of the carrier along a length l of the first and/or the second waveguide, where l approximates the length of the cavities and n is the integer.

15. The optical modulator as claimed in claim 1 wherein each of the cavities has a slightly different resonant frequency within the predetermined bandwidth.

16. The optical modulator as claimed in claim 1 wherein live and ground electrodes of each cavity are spaced apart and are substantially parallel to one another.

17. The optical modulator as claimed in claim 16 wherein the first and the second waveguide form a pair of waveguides arranged substantially parallel to and intermediate the live and ground electrodes of the associated cavities.

18. The optical modulator as claimed in claim 17 wherein each of the ground electrode is one pair of a pair of spaced-apart ground electrodes.

19. The optical modulator as claimed in claim 18 wherein the pair of waveguides is positioned between the pair of ground electrodes and each of the live electrodes is positioned between the pair of waveguides.

20. The optical modulator as claimed in claim 1 wherein the first and the second waveguides are arms of a Mach-Zehner-type interferometer device.

21. An optical modulator for modulating an optical carrier by an electrical signal, the modulator comprising:

a first and a second waveguide for guiding the carrier, each waveguide being formed from or being juxtaposed with respect to an electro-optic material, a first cavity associated with the first waveguide, the first and the second cavities that are terminated by either capacitors, inductors or transmission line equivalents thereof, means for applying the electrical signal having a predetermined bandwidth to the cavities; the cavities having a resonant frequency within the predetermined bandwidth and being parallel-coupled to each other such that, in use, a phase difference for the modulating signals of the carrier guided in the first and the second waveguide is effected.

22. The optical modulator as claimed in claim 21 wherein the phase difference of the modulating signals is substantially 90°.

23. The optical modulator as claimed in claim 1 wherein the waveguides and the cavities are fabricated on a common substrate.

24. The optical modulator as claimed in claim 21 wherein the waveguides and the cavities are fabricated on a common substrate.

25. A device for optical single sideband with carrier (OSSB+C) transmission including the optical modulator as claimed in claim 1.

26. A device for optical single sideband with carrier (OSSB+C) transmission including the optical modulator as claimed in claim 21.

27. An optical modulator for modulating an optical carrier by all electrical signal, the modulator comprising:

a first and a second waveguide for guiding the optical carrier, each waveguide being formed from, or being juxtaposed with respect to, an electro-optic material;

a first series of series-coupled cavities being associated with the first waveguide and a second series of series-coupled cavities being associated with the second waveguide, each cavity of the first series of the cavities being parallel-coupled with a respective cavity of the second series of cavities, parallel-coupling of the cavities being affected and in a manner so to induce standing waves in the cavities; and means for applying the electrical signal having a predetermined bandwidth to the cavities; the cavities having a resonant frequency within the predetermined bandwidth.

* * * * *